United States Patent [11] 3,626,318

[72] Inventor Charles Gilbert Young
Storrs, Conn.
[21] Appl. No. 18,265
[22] Filed Mar. 10, 1970
[45] Patented Dec. 7, 1971
[73] Assignee American Optical Corporation
Southbridge, Mass.

[54] TANDEM OSCILLATOR DISC AMPLIFIER WITH TRIVALENT NEODYMIUM INPUT DISC AND TRIVALENT NEODYMIUM PLUS YTTERBIUM OUTPUT DISCS
6 Claims, 3 Drawing Figs.

[52] U.S. Cl..................................................... 331/94.5,
330/4.3
[51] Int. Cl..................................................... H01s 3/14

[50] Field of Search............................................ 331/94.5;
330/4.3

*Primary Examiner*—Ronald L. Wibert
*Assistant Examiner*—T. Major
*Attorneys*—William C. Nealon, Noble S. Williams, Robert J. Bird and Bernard L. Sweeney ABSTRACT: A laser system is disclosed as including a conventional laser generator in tandem and in optical alignment with a laser amplifier, the laser amplifier having a series of laser disks disposed in parallel array in a laser cavity with a coolant therein. The laser disks are arranged as amplifier input disks and amplifier output disks with the input disks using trivalent neodymium as the active ingredient and the output disks using a combination of trivalent neodymium and trivalent ytterbium as the active laser material.

PATENTED DEC 7 1971   3,626,318

INVENTOR.
CHARLES GILBERT YOUNG
BY *Amster & Rothstein*
ATTORNEYS

TANDEM OSCILLATOR DISC AMPLIFIER WITH TRIVALENT NEODYMIUM INPUT DISC AND TRIVALENT NEODYMIUM PLUS YTTERBIUM OUTPUT DISCS

This invention relates primarily to laser devices and more particularly to laser amplifiers and a particular construction thereof for preventing premature inversion depletion, premature output and damage to the input part of the amplifier.

In order to describe this invention, it is important first to briefly describe the operating characteristics of lasers. Lasers are light-amplifying or light-producing devices specifically adapted to provide an output of high-intensity coherent monochromatic light. Such light is produced in a laser (an acronym for light amplification by stimulated emission of radiation) by photonic emission from the activator ions of a body or material including a so-called laser host material. These atoms which are in a "positive temperature" state, absorb a quantum of light or energy from a pump source which is at a frequency corresponding to the difference in energy between two of the energy levels of the atom. The atoms are thereby pumped or excited to a high energy level and a "negative temperature" state of population inversion, from which they rapidly and spontaneously (but not radiatively) relax to a more stable intermediate level, which is still above the original level. From this intermediate level, the atoms spontaneously relax to the original level with an attendant fluorescent emission.

The fluorescent emission emitted by the spontaneous relaxing atoms passes through the resonant cavity to the ends thereof and is then reflected back and forth through the cavity to excite other atoms at the intermediate energy level. Such reflecting energy induces the other atoms to undergo emissive transitions downward, producing more light and augmenting the bidirectionally refractive light to induce still further emissive transitions from the intermediate level population. In this way, a rising pulse of bidirectionally reflecting light quickly develops within the cavity, reaching a quantitatively large magnitude as the emissive transitions of atoms from the intermediate level population become massive. Light of high intensity is thereby created in one or a succession of light pulses while the pumping source is active, the action continuing until depletion of the intermediate level population restores the laser body to a "positive temperature" state. To permit emission of a part of this bidirectionally reflecting light pulse or pulses from the laser cavity, one reflective end of the cavity is made partially transmissive and the fraction of light escaping therethrough constitutes the laser output. Such laser action is also exhibited in a laser amplifier for amplifying a laser signal.

In proceedings of the IEEE, Vol. 57, No. 7, July, 1969, an article entitled "Glass Lasers" by C. Gilbert Young on pages 1,267–1,289 thereof, and particularly on page 1,271, details the properties of trivalent neodymium and a glass including both trivalent neodymium and trivalent ytterbium. Furthermore, Pearson and Porto reported laser oscillation in trivalent ytterbium-trivalent neodymium glass in their article entitled "- Nonradiative Energy Exchange and Laser Oscillation in $Yb^{3+}$–$Nd^{3+}$–" Applied Physics Letters, Vol. 4, No. 12, June 15, 1964, pp. 202–204. Using these articles as background, it may be seen that trivalent neodymium as an active laser ingredient provides extremely high gain per unit pumping input but a low energy storage or energy output capability when compared with a combination of trivalent neodymium and trivalent ytterbium as an active laser ingredient. We may assume that trivalent ytterbium helps to increase the inversion capability by a factor of about four.

Also, it is known in the laser technology that desired characteristics of laser devices, and particularly laser amplifier devices, include avoiding premature depletion of the inversion leading to unstable oscillations before the pulse to be amplified traverses a particular laser device section in order to avoid stray reflections and to produce a higher gain capability. Furthermore, it is also desired that premature output before a controlled predetermined output time should be avoided along with the avoidance of damage to the input part of the amplifier.

Accordingly, a primary object of the present invention is to provide a laser device with increased efficiency of output.

A further and more particular object of the present invention is to provide a laser device to avoid premature depletion of the inversion established in the laser cavity, premature output and damage to the input part of the amplifier.

A still further object is to provide an efficient laser amplifier device with less pulse distortion than prior art devices, yet with a capability for quick, high gain.

These and other objects of the present invention are accomplished in accordance with one illustrative embodiment of the present invention by a laser amplifier device including a combination of trivalent neodymium disks at the input end of the laser amplifier cavity and trivalent neodymium-trivalent ytterbium disks at the output end of the laser amplifier cavity. The disks are arranged in a parallel array in the amplifier cavity (either perpendicular to the optical axis or at Brewster's angle) with a coolant disposed therebetween. The trivalent-neodymium-doped disks at the input end are to provide a high-gain capability for the amplifier device and the trivalent neodymium-trivalent ytterbium disks at the output end are included to provide a high-energy storage and energy output capability for the amplifier. The combination prevents premature output as might be the case with the use of a trivalent neodymium dopant alone and premature depletion of the inversion potentially leading to unstable oscillations before the pulse to be amplified comes along is prevented by the use of trivalent neodymium and trivalent ytterbium at the output stage.

The above description as well as further objects, features and advantages of the present invention will be more fully appreciated by reference to the following detailed description of the preferred but nonetheless illustrative embodiment when taken in conjunction with the drawings, wherein.

Figure 1:
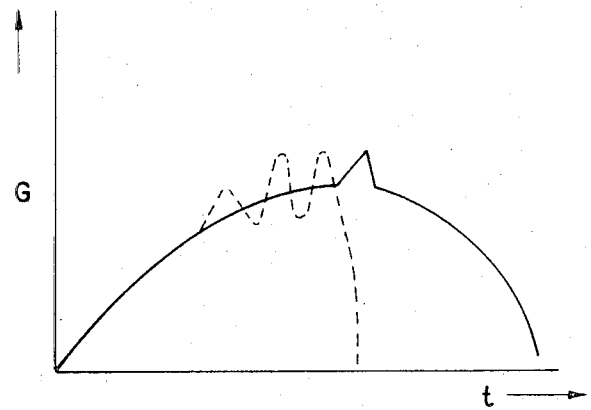
FIG. 1 is a graphical representation of the comparison between the time of inversion depletion with a neodymium-doped laser and a combination neodymium-ytterbium-doped laser.

Referring to the drawings and in particular FIG. 1, the plot of gain vs. time for neodymium laser devices (broken line in FIG. 1) exhibits unstable oscillations possibly leading to a potentially premature inversion depletion before the pulse to be amplified comes along. Such performance arises from stray reflections. On the other hand, the gain vs. time line for neodymium-ytterbium-doped laser devices (solid line in FIG. 1) shows a considerably higher gain capability more likely to produce stable operation for the same pumping input. From the graph in FIG. 1, it may be seen that a capability for providing laser amplification at a predetermined output time thereby preventing damage to the early amplifier may be accomplished by the use of neodymium-doped disks 10 (FIG. 3) at the early stages of the amplifier, and neodymium-ytterbium disks 42 at the output end.

Figure 2:
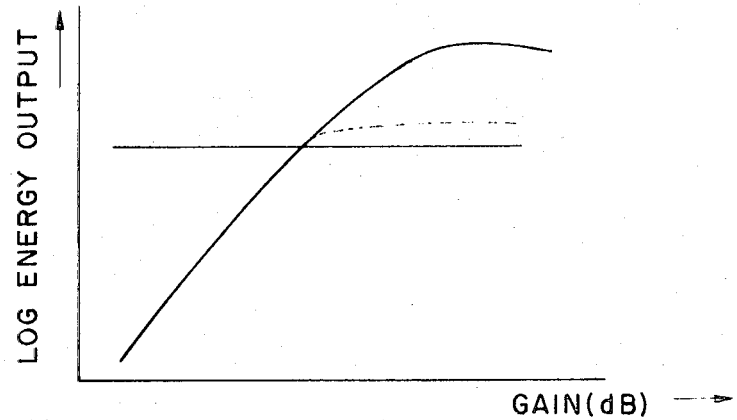
FIG. 2 is a graphical representation of a comparison for inversion capability (energy storage capability) of a neodymium-doped laser device and a combination neodymium-ytterbium-doped laser device; and, FIG. 3 is a schematic representation of a laser amplifier system according to the present invention.

The graph of FIG. 2, conversely, shows a much higher energy output capability for neodymium-ytterbium-doped laser material (solid line in FIG. 2) when compared to the energy output capability for the same gain in a neodymium-doped laser material (broken line in FIG. 2). Since ytterbium emits at 1.06 microns at room temperature, it is a compatible dopant for use with 1.06 micron neodymium-doped laser systems. A neodymium-ytterbium laser operates through absorption in both neodymium and ytterbium bands and nonradiative energy transfer from the neodymium to the ytterbium. By proper choice of the concentration of neodymium and ytterbium, essentially all available excitation from a pump flashtube 12 (FIG. 3) can be put into ytterbium inversion. Therefore, energy storage capability for equal gain in the neodymium-ytterbium glass laser is about 16 times higher than that for neodymium glass. This is particularly important in power amplifiers or where a minimum of pulse sharpening or target feedback instability is desired. In addition, the longer fluorescent lifetime exhibited by the neodymium-ytterbium combination and the increased absorption provided by the neodymium-ytterbium combination should provide more efficient Q-switched operation and afford an improved match to the pumping flashtubes 12. These factors account for the experimentally observed four times higher inversion for equal pumping in the neodymium-ytterbium glass as compared to neodymium-doped laser glass, the latter of which is still useful for quick gain.

Figure 3:
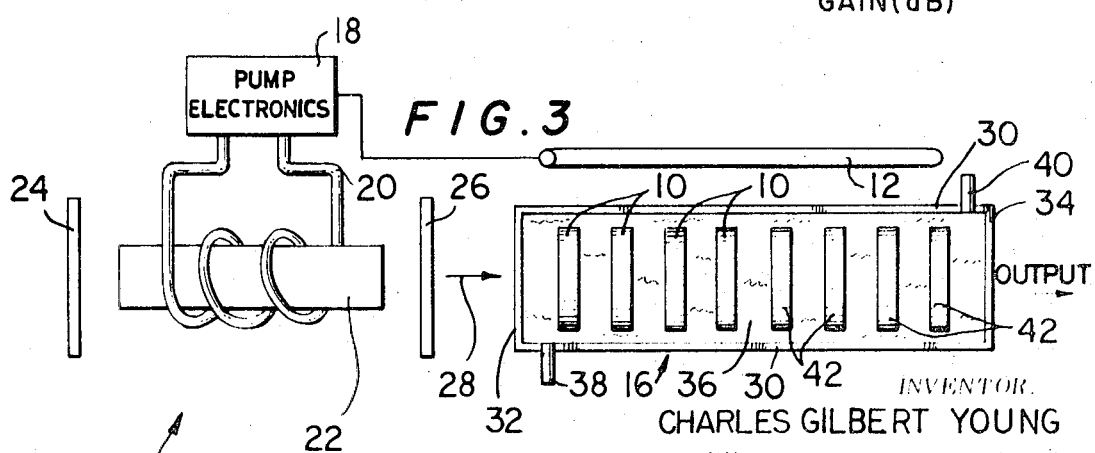

Accordingly, a laser system as shown in FIG. 3 has proved to be extremely efficient and useful. The system includes a conventional laser oscillator generally designated 14 and a laser amplifier generally designated 16, the oscillator 14 including pump electronics 18 for activating a pumping flashtube 20 shown in FIG. 3 to be of spiral configuration but which could be of any other configuration normally used for flashtubes in laser devices. The oscillator 14 further includes sidewalls 22 for a resonant cavity which may be of the cylindrical type with the sidewalls 22 being transmissive to the pumping wavelength. End mirrors 24, 26 are disposed at the ends of the laser cavity and displaced therefrom or in any other end mirror configuration normally associated with laser devices. The end mirror 26 is made partially transmissive to provide a laser input 28 to the laser amplifier 16.

The laser amplifier 16 is shown in FIG. 3 as including a pumping flashtube 12 of elongated configuration (other configurations are also useful for the flashtube 12) and an amplifier cavity having sidewalls 30 and totally transmissive end walls 32, 34. The cavity may be a cylindrical configuration and sealed to provide a housing for a coolant 36 disposed therein. The housing further includes an input means 38 and an output means 40 for providing a flow of the coolant 36 in the amplifier cavity. Also disposed within the laser amplifier 16 are parallel disks 10, 42 the disks 10 being of a material including trivalent-neodymium as the active ingredient and the disks 42 including material having trivalent-neodymium and trivalent-ytterbium as the active ingredients.

The specific makeup of the material for disks 10 may be of any known neodymium-doped glass laser materials but a recommended composition would be to concentrate $Nd_2O_3$ in the range of 0.5 weight percent to 6 weight percent in a glass base having a composition of 59 weight percent $SiO_2$, 25 weight percent BaO, 15 weight percent $K_2O$ and 1 weight percent $Sb_2O_3$. Likewise, the particular composition for the material used in disks 42 may vary according to the many compositions published and known as of this time and to be developed; however, a recommended composition would include concentrations of trivalent ytterbium and trivalent neodymium of 1/10 to 10 weight percent in a glass base whose principal constituents are in the ratio of 75 weight percent $SiO_2$, 8 weight percent $Na_2O$, 12 weight percent $K_2O$ and 5 weight percent BaO.

It should be understood that the laser generator or oscillator 14 may be any one of a number of sources of 1.06-micron laser light, such as 1.06 microns emitting yttrium aluminum garnet, a 1.06-micron emitting gas laser or a neodymium glass laser. Also, by way of example the amplifier cavity if about 2 feet long with disks 1 inch in diameter and about three sixteenths inch thick cooled by heavy water. Enough neodymium is used in the disks 10 to attain saturation level quickly (solid horizontal line in FIG. 2), which is a function of pumping intensity, length of the amplifier and other parameters. As an illustration, the saturation level of FIG. 2 is 10 joules per square centimeter. Furthermore, the illustration of FIG. 3 shows half the disks to be neodymium-ytterbium doped, but it is to be understood that the proportion may be varied.

What is claimed is:

1. A laser amplifier for use with a pump source and a laser oscillator and in optical alignment with said oscillator comprising a laser cavity having sidewalls transmissive to the pumping wavelength emitted by said pump source, said cavity including end walls transmissive to the wavelength of laser emission and an active laser material in the form of parallel disks arranged along the optical axis, said disks at the input end of said amplifier including trivalent neodymium as the active laser constituent and said disks at the output end of said amplifier including trivalent neodymium and trivalent ytterbium as the active laser constituent.

2. The invention according to claim 1 wherein a coolant is included in said cavity for cooling said laser amplifier disks.

3. The invention according to claim 2 wherein said coolant is heavy water and means are provided with said cavity for causing the flow of said water between and around said disks.

4. A laser system including a laser oscillator emitting laser output radiation at 1.06 microns' wavelength, a laser amplifier including disks at the input end thereof having trivalent neodymium as the active laser constituent thereof and disks at the output end of said amplifier having trivalent neodymium and trivalent ytterbium as the active laser constituent thereof, said laser amplifier and laser oscillator being in optical alignment and means for providing an output of 1.06 microns' wavelength from said amplifier.

5. The invention according to claim 4 wherein means are provided for cooling the laser disks in said amplifier.

6. The invention according to claim 5 wherein said means for cooling includes a cavity for housing said coolant and said disks, input means in said cavity and output means in said cavity, said input and output means providing a flow of said coolant between and around said laser disks.

* * * * *